Dec. 24, 1929.  W. E. RUPLEY  1,741,076
ELECTRIC PIPE WELDING APPARATUS
Filed Sept. 26, 1925   3 Sheets-Sheet 1

Inventor
William E. Rupley.
By Lyon & Lyon
Attorneys

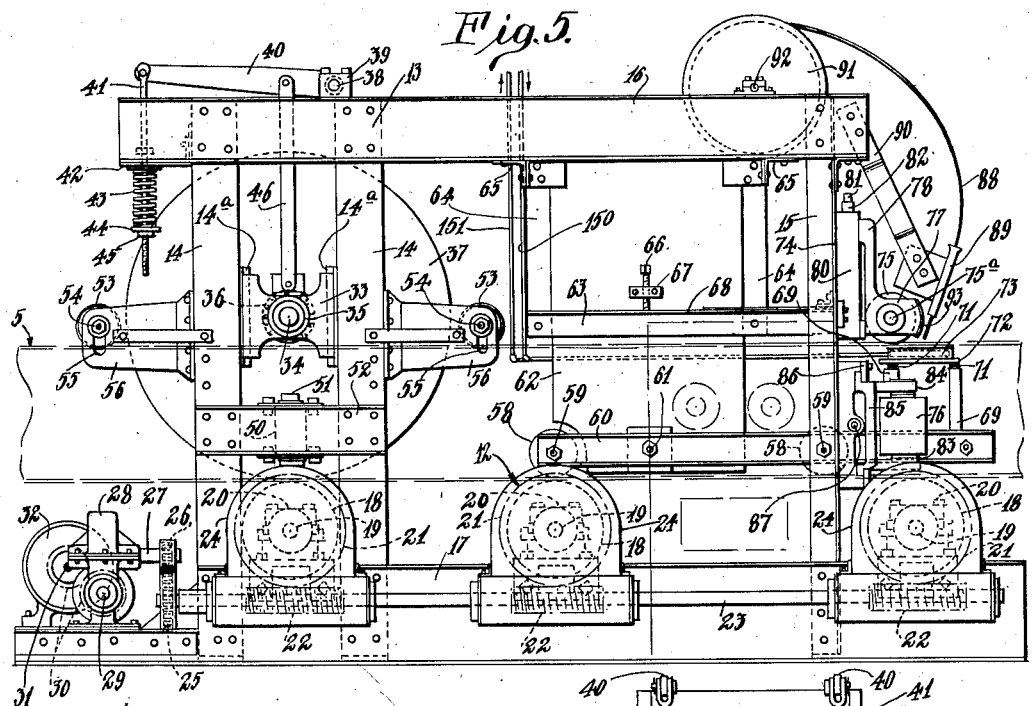

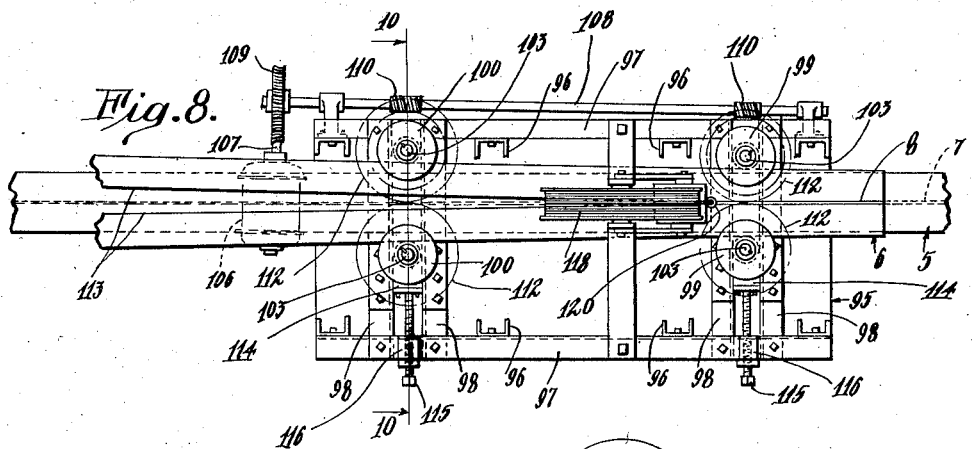

Patented Dec. 24, 1929

1,741,076

UNITED STATES PATENT OFFICE

WILLIAM E. RUPLEY, OF LOS ANGELES, CALIFORNIA, ASSIGNOR TO WESTERN PIPE AND STEEL COMPANY OF CALIFORNIA, OF SAN FRANCISCO, CALIFORNIA, A CORPORATION OF CALIFORNIA

ELECTRIC PIPE-WELDING APPARATUS

Application filed September 26, 1925. Serial No. 58,952.

This invention relates to weld pipe and method and apparatus for forming the same.

An object of this invention is to provide a method and apparatus for forming welded pipe of a single sheet of steel rolled to cylindrical form and welded at a longitudinal seam and the edges of the said tubular sheet and which welded pipe is adapted to be employed for a fluid conduit or which may be employed as the inner member of a stove pipe casing.

Another object of this invention is to provide a stove-pipe casing made up of stands of casing constructed of concentric casing members, each of which concentric casing members is formed from a single portion of sheet metal rolled to the desired shape, and which concentric casings are rigidly secured one to the other at a longitudinal seam.

Another object of this invention is to provide a stove-pipe casing having a uniform exterior contour throughout its length so that the same will not "hang up" during the driving of the same into a well.

Another object of this invention is to provide a method of forming the casing, which method is comparatively inexpensive and will produce a stove-pipe casing of great durability and strength.

Another object of this invention is to provide apparatus for carrying out a method for forming the stovepipe casing.

Other objects and advantages of this invention will be apparent from the following detailed description of a preferred embodiment thereof, as illustrated in the accompanying drawings, in which drawings:

Fig. 5 is a side elevation of the apparatus, for forming welded pipe, embodying this invention.

Fig. 6 is an end elevation thereof looking from right to left in Fig. 5.

Fig. 7 is an end elevation of the apparatus shown in Fig. 5, looking from left to right.

Fig. 8 is a diagrammatic top plan view of the apparatus employed for forming and assembling stove-pipe casing, embodying this invention.

Fig. 9 is a diagrammatic side elevation thereof.

Fig. 10 is a sectional end elevation thereof, taken substantially on the line 10—10 of Fig. 8.

Figure 1:
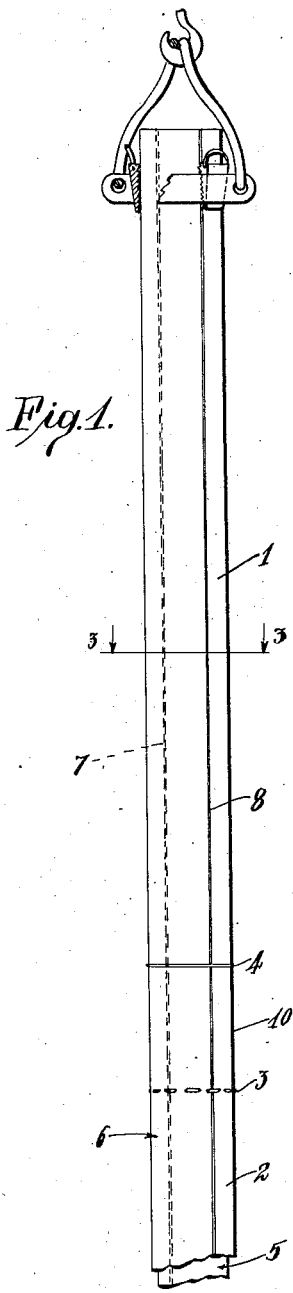
Fig. 1 is a side elevation of a stove-pipe casing embodying this invention.
Figure 2:
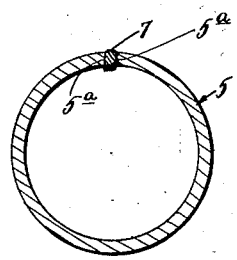
Fig. 2 is an end section of a welded pipe embodying this invention.
Figure 3:
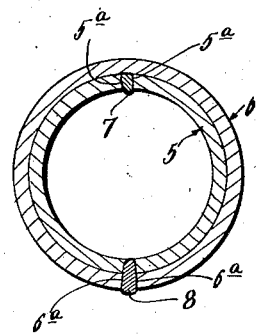
Fig. 3 is an end sectional view taken substantially on the line 3—3 of Fig. 1.
Figure 4:
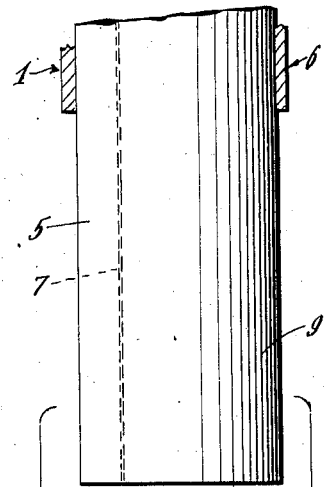
Fig. 4 is a side elevation, partly in vertical section, of a fragment of stove-pipe casing embodying this invention, illustrating the manner of assembling the stands of casing.
Figure 4:
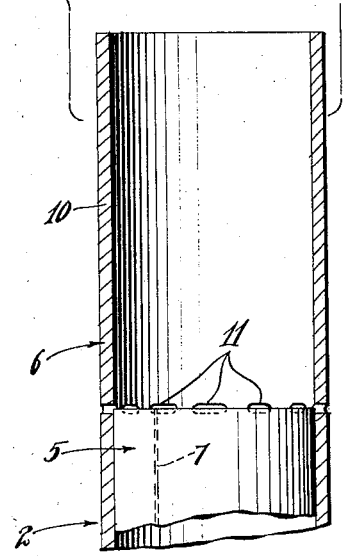

In the preferred embodiment of this invention illustrated in the accompanying drawings, 1 illustrates a stand of casing which is rigidly secured to a second stand of casing 2 at the joints or welds 3 and 4. The stands of casing 1 and 2 are made up of one-piece rolled metal tubular members 5 and 6. The inner tubular member or welded pipe 5 is formed of sheet metal rolled to the required diameter and secured together at its abutting edges 5ª by means of a butt weld 7, the inner tubular member 5 being properly welded is then secured within the outer tubular member 6 which is likewise formed of a single portion of rolled sheet metal and which is positioned around the inner tubular member 5 and has its abutting edges 6ª forced together and welded at a butt weld 8 to the inner tubular member 5 so that the tubular members 5 and 6 are rigidly secured together at the weld 8 along the longitudinal seam which extends throughout the stand of casing. The end 9 of the inner tubular member 5 projects from one end of the casing 6, as illustrated in Fig. 4. The end 10 of the outer tubular member 6 extends beyond the end of the inner tubular member 5 at the opposite end of the stand of casing, so that the end 9 of one stand of casing 1 may be fitted within the end 10 of a second stand of casing 2. The projecting ends 9 and 10 are equal length so that the end of the inner tubular member 5 abuts the ends of the second tubular member 5, and so that the upper end of the tubular outer member of the casing 2 abuts the lower end of the tubular member 6 of the casing 1. Being so positioned, the abutting ends of the tubular members 6 are butt welded together and to the inner tubular member 5 in the same manner as the other tubular sections of casing are illustrated as welded together in my copending application filed September 26, 1925, Serial No. 58,591. A plurality of perforations 11 are formed in the outer tubular member 6 of the casing 2 adjacent the upper end of the inner tubular member 5 so that the abutting ends of two such tubular members 5 may be welded together and secured by the weld to the outer tubular member 6 of the stands 2 of casing.

The inner tubular members or welded pipes 5 are formed of a single portion of metal which is first rolled to approximately the desired or required diameter in any preferred or desired manner and as is well understood in the art.

The rolled section of metal which in most cases will be approximately thirty feet in length, is then placed upon a carriage 12 of apparatus for welding the longitudinal seam 7 of the said casing 5 at the edges 5$^a$. This apparatus includes a frame 13 composed of uprights 14 and 15 connected together by means of longitudinal extending channel irons 16, and a pair of lower longitudinal extending I beams 17 at the lower end of the uprights 14 and 15. The carriage 12 comprises a plurality of rollers 18 supported on and secured to shafts 19 which are mounted in bearings 20 secured to the I beams 17. A worm gear 21 is rigidly secured to one end of each shaft 19, which worm gears 21 mesh with worms 22 mounted on and secured to the longitudinal extending shaft 23, which shaft 23 is supported in bearings (not shown) mounted in gear housings 24 which enclose the gears 21 and 22 and are secured to the longitudinal extending I beams 17.

Secured to one end of the shaft 23 is a gear 25 which meshes with a pinion 26, which pinion 26 is keyed or otherwise secured to the shaft 27, which shaft 27 is secured to a worm gear mounted within the housing 28, which worm gear meshes with a worm also within the housing and which worm 28 is driven from a shaft 29 through the gears 30 from the drive shaft 31 of the motor 32. The worm gears mounted within the housing 28 are for the purpose of reducing the speed so that the rollers 18 mounted upon the shafts 19 revolve at a relatively slow rate.

Secured to the uprights 14 are guides 14$^a$ for traveling blocks 33, which traveling blocks 33 support a shaft 34 in bearing 35. Mounted on the shaft 34 on a flange 36, which flange 36 is rigidly secured to the shaft 34, is a large flat steel plate 37 of circular perimeter and relatively thin.

Means are provided for yieldably urging the plate 37 downward which means comprise a rock shaft 38 mounted in bearing 39 on longitudinally extending channels 16 and to which rock shaft 38 a pair of rocker arms 40 are secured to the outer end of which rocker arms 40 links 41 are secured, which links 41 pass through perforations formed in an end plate 42 of the frame 13. Compression springs 43 are mounted on the lower end of the links 40 and engage the under surface of the plate 42 at their upper edges and engage washers 44 at their lower ends, which washers 44 are adjustably held in position on the links 40 by means of nuts 45 which are screw-threaded to the links 40. Connecting links 46 connect the rocker arms 40 with the traveling blocks 33. By this means the circular plate 37 is forced down so that the perimeter thereof is engaged on the lower inside surface of the roller sheet steel section of which the welded pipe 5 is to be formed, the plate 37 passing between the edges 5$^a$. The circular plate 37 is rotated with the shaft 34 during the travels of the tubular member 5. The force with which the circular plate 37 bears down tubular member 5, to engage the same with the rollers 18 so that the tubular section will be driven through the apparatus, is regulated by the compression of the springs 43.

In order to support the inner tubular member 5 on the rollers 18, a pair of rollers 50 mounted on pins 51 are supported in brackets 52 secured to the uprights 14 to engage the outer perimeter of the tubular section 5 are provided.

In order to guide the sheet metal which has been rolled to form the tubular member 5 on the carriage 12 so that the seam 7 formed at the abutting edges thereof will be an approximately straight-line seam, a pair of wheels 53 are provided, which wheels 53 have hard steel surfaces and are positioned between the edges 5$^a$ of the tubular member 5 and are for the purpose of holding the edges 5$^a$ apart so that the same will not engage the side of the plate 37 and to guide the tubular member 5. The wheels 53 are journaled on pins 54, which pins 54 are adjustably mounted in slots 55 formed in the brackets 56. The brackets 56 are secured to the edge faces of the uprights 14.

The tubular member 5 is welded at the longitudinal seam 7 while supported upon the two end driving rollers 18 and is held in engagement with the two end rollers 18 by means of a pair of pressure rollers 58 which are rotatably journaled on pins 59 carried by the I-beams 60. The I-beams 60 are pivotally secured at a pin 61 to the plate 62. The plate 62 is formed of sheet metal and is slidably supported between a pair of longitudinally extending guides 63. The guides 63 are secured to uprights 64, which uprights 64 are secured to the transversely extending angle irons 65 which connect the longitudinally extending channel irons 16 of the frame 13. The weight of the plate 62, I-beams 60 and rollers 58 is supported on the lowest inside surface of the tubular member 5 and causes the same to be engaged against the curved surface of the two end rollers 18. In order to prevent the plate 62 from falling out of position when the member 5 is removed from the apparatus, a pair of adjusting screws 66 are screw-threaded within brackets 67 which are secured to the face of the plate 62 so that the lower ends of the screws 66 engage the transverse extension 68 of the longitudinally extending guide 63.

The plate 62 extends into the interior of the tubular section 5 between the edges 5ª of the rolled section of material that has been rolled to the approximate size and diameter required for the formation of the inner tubular member 5.

Means are provided for yieldably supporting a mandrel or welding anvil 73 in position against the under surface of the tubular member 5 at the edges 5ª, which means preferably comprise a plate 72 which is secured to the upper end face of the pins 70. Secured to the top surface of the plate 72 is the welding hollow anvil 73 which may be constructed of copper or other like material. The anvil 73 is for the purpose of supporting the under surface of the edges 5ª of the tubular section 5 at the point of welding of the longitudinal weld, or seam 7 and is to prevent the burning through of the weld 7 so as to form a smooth straight longitudinal seam 7 throughout the length of the tubular section 5.

A pair of spaced sleeves 69 are secured to the I-beams 60. The pins 70 are slidably mounted in the sleeves 69. Compression springs 71 surround the pins 70 within the sleeves 69 and engage the under surface of the plate 72 so as to yieldably urge the anvil 73 upward.

The hollow anvil 73 is water-cooled so as to prevent the burning of the same during the welding. Water is circulated to the hollow anvil 73 through an inlet pipe 150 and from the hollow anvil 73 through the outlet pipe 151. The pipe 150 is connected to any suitable source of water supply (not shown) and the pipe 151 discharges the water to any suitable point (not shown).

The end plate 74 is secured to the uprights 15 and is for the purpose of adjustably supporting the forming rollers or rolls 75 and 76. The rollers 75 are for the purpose of engaging the upper surface of the tubular section 5 at the edges 5ª just prior to the welding of the seam 7 to force the edges of the sheet metal into alignment over the welding anvil 73.

Each of the two rollers 75 is journaled at a pin 75ª to a supporting arm, which arm 77 is an outward extension of a guide plate 78. The plate 78 is slidably supported within channel iron guides 79 which are secured to the guide frame 80, which frame 80 is supported on the surface of the plate 74. An adjusting screw 81 is screw-threaded within the boss 82 formed on the upper surface of the guide frame 80. The lower end of the screw 81 is secured to the plate 78. By adjusting the screw 81 the pressure at which the rollers 75 engage the upper surface of the tubular section 5 may be regulated. The rollers 75, being separately adjustable, the same may be regulated so that the edge 5ª will be forced into horizontal alignment on the anvil 73, irrespective of the "roll" of the tubular member 5.

The rollers 76 are for the purpose of supporting the sides of the tubular member 5 during the forcing together of the edges 5ª thereof that are to be welded together at the seam 7 as the rollers 75 force these edges 5ª into horizontal alignment prior to the welding of the seam 7. The rollers 76 are mounted on pins 83 within forks 84 which are formed integrally with or secured to the sliding plates 85, which plates 85 are supported within guide-frames 86 and are adjustable to or from engaging position by means of screws 87 in a similar manner to the adjustment of the engaging position of the roller 75. It will therefore be seen that by means of the rollers 75 and 76 the edges of the section of material that has been rolled to form the tubular section 5 are forced into longitudinal alignment and are forced together so that a uniform and straight line welded seam 7 may be formed.

The welded seam 7 is formed in any desired or preferred manner and is preferably formed by electric welding employing a welding rod or strand 88 and an electric welding unit diagrammatically illustrated at 89 which is supported by the arms 90 which are secured to the longitudinally extending I-beam 16. The welding strand 88 is rolled upon a roll 91 which is rotatably supported at a pin 92 on the upper surface of the longitudinally extending I-beam 16. The welding strand 88 is made one of the electrodes for the welding, while the entire apparatus is grounded so that the tubular section 5 forms the opposite electrode for the electric weld, which operation is so well understood in the art that applicant does not deem it necessary to illustrate in detail the apparatus employed for electric welding such a seam 7.

A guard 93 is secured to the end of one arm 77 and is for the purpose of preventing the burning of the rollers 75 during the welding operation.

The end of the welding strand is supported in position adjacent to the forming rollers 75.

The inner tubular member 5 having been formed as above described, the same may be positioned within the tubular member 6 which forms the outer section for the stove pipe casing and is secured therein and welded to the outer tubular member 6 in a manner that will now be described.

Referring to Figs. 8, 9 and 10, 95 illustrates a frame constructed of a plurality of uprights 96, longitudinally extending on beams 97 and transverse braces 98. The section of rolled metal of which the tubular member 6 is formed is positioned around the tubular member 5, and this assembly is supported by and driven forward by a plurality of forward rollers 99 and rearward rollers 100. The rollers 99 and 100 have arcuate engaging faces 101 and 102 respectively, which faces are so formed as to approximate the exterior curvature of the tubular section 6. The rollers 99 and 100 are mounted on and secured to shafts 103, which shafts 103 are journaled in bearings 104 supported on the braces 98, as illustrated at 105. A motor 106 is provided for driving the rollers 99 and 100. The drive shaft 107 of the motor 106 drives a countershaft 108 through a reducing worm 109 so that the speed of the countershaft 108 is materially reduced.

The countershaft 108 is connected in driving relation through a second set of reducing worm gears 110 to one shaft of each pair of rollers 99 and 100. The shafts 103 which are driven through the reducing worms 110 are mounted in stationary relation in the frame 95 and at their lower ends in bearing 111. The opposite shaft 103 is driven from these worm-driven shafts 103 through gears 112. The reducing worms 110 serve to further reduce the speed of rotation of the rollers 99 and 100 so that the same are driven at a relatively slow rate of speed to drive the tubular members 5 and 6 through the apparatus slowly.

The shafts 103 which are driven through the gears 112 from the worm driven shafts 103 are adjustably supported in the frame 95 so that the position of the rollers 99 and 100 supported thereby may be adjusted relative to the opposite rollers 99 and 100, so that the tendency of these rollers to force the outer tubular section 6 together at the edges 113 may be regulated. The rollers 100 are spaced further apart than the rollers 99 so that the edges 113 of the tubular section 6 are forced together in step-wise manner. The rollers 99 being so positioned that the edges 113 are forced nearly into engagement when passing therethrough.

The shafts 103 which support the adjustable rollers 99 and 100 are adjustably supported in any preferred or desired manner, and as only a slight adjustment is required, the bearings 104 in which these shafts are journaled are supported on the transverse braces 98 on slides 114 by which slides 114 screws 115 are secured, which screws 115 are screw-threaded in blocks 116 mounted on the frame 95. The lower end of these shafts 103 is supported in bearing 117 so as to permit a slight movement of these ends of these shafts 103 at this point.

Supported on the frame 95 is a reel 118 on which reel 118 the welding strand 119 is wound, the welding end of this strand 119 being supported in a holder 120 just in advance of the rollers 99 as is illustrated in Fig. 9. This apparatus for forming the longitudinal welded seam 8 by means of which the edges 113 of the tubular section 6 are welded together and to the tubular section 5 is not illustrated, as the same is of the familiar type and design usually employed, which is well understood in the art.

The operation of this apparatus shown in Figures 8, 9 and 10 is:—

The tubular members 5 and 6, being properly positioned as heretofore described, the motor 106 is set in operation and drives the rollers 99 and 100, which have been previously adjusted as to position. The tubular members 5 and 6 are driven through the apparatus, and the pair of rollers 99 and 100 successively force the edges 113 of the member 6 together, and the rollers 99 and 100, by their arcuate faces 101 and 102, force the tubular member 106 into the proper curvature to conform to the curvature of the member 5. During this driving and forming of the tubular members 5 and 6, the longitudinally welded seam 8 is formed by means of which the edges 113 are welded together and to the tubular member 5.

Having fully described a preferred embodiment of my invention, it is to be understood that I do not wish to be limited to the exact details herein set forth, but my invention is of the scope of the appended claims.

I claim:—

1. In an apparatus for forming stove-pipe casing, the combination of a plurality of rollers adapted to convey a rolled tubular sheet metal member along, yieldingly movable, pressure applying means for holding the tubular sheet metal member in engagement with the said rollers, means for driving the rollers at a relatively low speed, means for forcing the edges of the tubular member together in horizontal alignment, and means for welding a continuous longitudinal seam for securing the said edges together.

2. In an apparatus of the class described, the combination of a frame, a carrier means within the frame, adapted to receive and support a section of rolled sheet metal in position in said frame, means for holding the section of rolled metal in engagement with the carrier means so that the same be conveyed along by the carrier means, means for supporting a welding anvil in position within the rolled sheet metal section in position against a welding electrode, and means for forcing the separate edges of the said section in alignment over the welding anvil.

3. In an apparatus of the class described, the combination of a carrier means, means for supporting a tubular member on the carrier means, means for yieldably supporting a welding anvil in position within the tubular section, and a pair of wheels, each of which is adapted to be engaged with an edge of the tubular section to force the said edges into horizontal alignment over the said anvil, and means for separately adjusting the position of each roller.

4. In an apparatus of the class described, the combination of a carrier means, means for supporting a rolled section of sheet metal on the carrier means, means for yieldably supporting a welding anvil in position within the said rolled section, a pair of wheels, each of which wheels is separately adjustable in position to engage an edge of the rolled section, and a pair of rollers mounted in position to force the said edges of the rolled section together over the said anvil.

5. In an apparatus for forming longitudinally welded casing, the combination of, a frame provided with means adapted to receive sheet metal in approximately tubular form, means for conveying said tubular sheet along said frame, means for guiding and maintaining abutting edges of a seam in said tubular sheet in an axial position, a welding anvil support carried by said frame and extending through said axial seam into said tubular sheet, a welding anvil attached to said support and positioned within said tubular sheet, means for forcing the abutting edges of said tubular sheet together over said anvil, means for maintaining and forming said tubular sheet in tubular form, and welding means for welding said abutted edges of said tubular sheet in a longitudinal seam.

6. An apparatus for forming longitudinally welded casing comprising, in combination, a frame provided with driven members adapted to receive a tubular sheet and convey said sheet along said frame, means for maintaining edges of a longitudinal seam in said tubular sheet in an axial position and in spaced relation, means extending through said longitudinal seam into said tubular sheet and adapted to maintain said sheet in contact with said driven members, a welding anvil positioned in said tubular sheet, means for forcing the abutting edges of said sheet together over said anvil, and welding means for welding said abutted edges of said tubular sheet together in a longitudinal seam.

Signed at Los Angeles, California this 11th day of September, 1925.

WILLIAM E. RUPLEY.